United States Patent [19]
Abe et al.

[11] Patent Number: 6,144,972
[45] Date of Patent: *Nov. 7, 2000

[54] MOVING IMAGE ANCHORING APPARATUS WHICH ESTIMATES THE MOVEMENT OF AN ANCHOR BASED ON THE MOVEMENT OF THE OBJECT WITH WHICH THE ANCHOR IS ASSOCIATED UTILIZING A PATTERN MATCHING TECHNIQUE

[75] Inventors: Hironobu Abe; Junshiro Kanda; Koji Wakimoto; Satoshi Tanaka, all of Tokyo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/787,440

[22] Filed: Jan. 22, 1997

Related U.S. Application Data

[63] Continuation-in-part of application No. 08/674,788, Jul. 3, 1996, Pat. No. 5,970,504.

[30] Foreign Application Priority Data

Jan. 31, 1996 [JP] Japan ................................. 8-014844
Oct. 29, 1996 [JP] Japan ................................. 8-286378

[51] Int. Cl.⁷ .................................................. G06T 1/00
[52] U.S. Cl. .......................... 707/501; 382/190; 345/475; 345/328
[58] Field of Search ................................. 395/173–175, 395/762, 773, 777, 806–807, 200.48, 200.49, 200.33, 200.79; 348/407, 415–418, 422, 473; 707/500, 501, 513; 345/326–328, 339, 346, 302, 333, 335, 475; 382/181, 190, 195, 286, 199

[56] References Cited

U.S. PATENT DOCUMENTS

| | | | |
|---|---|---|---|
| 4,383,272 | 5/1983 | Netravali et al. ...................... | 348/416 |
| 5,214,758 | 5/1993 | Ohba et al. ............................. | 395/173 |
| 5,404,316 | 4/1995 | Klinger et al. ......................... | 395/328 |
| 5,410,358 | 4/1995 | Shackleton et al. .................... | 348/459 |
| 5,416,899 | 5/1995 | Poggio et al. .......................... | 395/175 |
| 5,539,871 | 7/1996 | Gibson ................................... | 395/762 |
| 5,596,705 | 1/1997 | Reimer et al. .......................... | 395/326 |
| 5,617,144 | 4/1997 | Lee ........................................ | 348/416 |
| 5,657,050 | 8/1997 | McCambridge et al. ............... | 348/141 |
| 5,708,845 | 1/1998 | Wistendahl et al. .................... | 345/302 |
| 5,774,666 | 6/1998 | Portuesi ............................. | 395/200.48 |

FOREIGN PATENT DOCUMENTS

| | | |
|---|---|---|
| 0596823 | 5/1994 | European Pat. Off. . |
| 352070 | 3/1991 | Japan . |
| 3292571 | 12/1991 | Japan . |
| 4-163589 | 6/1992 | Japan . |
| 6215047 | 8/1994 | Japan . |

OTHER PUBLICATIONS

V. Burrill, T. Kirste & J. Weiss "Time–Varying Sensitive Regions in Dynamic Multimedia Objects: Pragmatic Approach to Content–Based Retrieval From Video" Information & Software Technology 1994.

T. Satou & M. Sakauchi "A New Type Hypermedia Platform for Industrial Applications" Institute of Industrial Science, University of Tokyo, Japan, 1993.

(List continued on next page.)

*Primary Examiner*—Joseph H. Feild

[57] ABSTRACT

A moving image anchor setting apparatus for setting an anchor to a moving image including a frame specification portion for specifying a first frame from among a plurality of frames constituting the moving image; an anchor setting portion for setting an anchor by selecting a particular region overlapping a target object within the first frame to be an anchor region; and an anchor estimating portion for determining anchor information for a second frame by performing pattern matching utilizing an image of the first frame, the anchor information of the first frame, and an image of the second frame.

12 Claims, 13 Drawing Sheets

OTHER PUBLICATIONS

D. Lowe & A. Ginige "HyperImages: Using object Recognition for Navigation Through Images in Multimedia" School of Electrical Engineering, University of Technology, Syndey, Australia.

IBM Technical Disclosure Bulletin, Apr. 1994 "Multimedia Hypervideo Links for Full Motion Videos".

Y. Tonomura "Video Handling Based on Structured information for Hypermedia Systems" Nippon Telegraph & Telephone Corp. Kanagawa, Japan.

V–Active User's Guide, San Francisco, CA, Feb. 1996.

"A Method for Constructing Hypermedia Nodes from Objects that Appear in the Video Data," Hajime Takano et al., Human Interface, Proceedings of the Seventh Symposium on Human Interface, Oct. 23–25, 1991, pp. 301–306.

"A Navigation Style of a Video Hypermedia," Hajime Takano et al., Human Interface, Proceedings of the Eighth Symposium on Human Interface, Oct. 21–23, 1992, pp. 607–612.

"Implementation of a Distributed Video Hypermedia System," Kyoji Hirata et al., Tokyo, Dec. 8–9, 1994, pp. 165–173.

"VideoReality: A Flexible Video Observation System with Controlling Viewing Field," Fumiaki Miura et al., NTT Information and Communication Systems Labs, pp. 3–329–3–330 (w/translation), 1995.

"An Object Model for Video Information Systems," Seiichi Kon'Ya et al., NTT Information and Communication System Labs, pp. 3–331–3–332 (w/translation), 1995.

| ANCHOR ID | FRAME NO. | $x_1$ | $y_1$ | $x_2$ | $y_2$ |
|---|---|---|---|---|---|
| anchor 1 | 1 | 50 | 50 | 100 | 100 |
|  | 100 | 70 | 80 | 110 | 110 |

| ANCHOR ID | FRAME NO. | $x_1$ | $y_1$ | $x_2$ | $y_2$ |
|---|---|---|---|---|---|
| anchor 1 | 1 | 50 | 50 | 100 | 100 |
|  | 50 | 80 | 70 | 100 | 80 |
|  | 100 | 70 | 80 | 110 | 110 |

| ANCHOR ID | LINK FORMAT | LINK INFORMATION |
|---|---|---|
| anchor 1 | text | anchor 1. txt |
| anchor 2 | image | anchor 2. bmp |

MOVING IMAGE ANCHORING APPARATUS WHICH ESTIMATES THE MOVEMENT OF AN ANCHOR BASED ON THE MOVEMENT OF THE OBJECT WITH WHICH THE ANCHOR IS ASSOCIATED UTILIZING A PATTERN MATCHING TECHNIQUE

RELATED CASE

This application is a continuation-in-part of Ser. No. 08/674,788 filed Jul. 3, 1996 now U.S. Pat. No. 5,970,504.

BACKGROUND OF THE INVENTION

1. Field of the Invention

The present invention relates generally to a moving image anchor setting apparatus and a hypermedia apparatus employing this apparatus, and more particularly to an apparatus for inputting a moving image and setting an anchor to targets and suchlike included in the moving image, to a moving image hypermedia apparatus for linking related information to an anchor set by this apparatus and executing functions such as intended retrieval, and to a moving image providing system utilizing this apparatus in a server-client system.

2. Description of the Prior Art

Generally in previous hypermedia apparatus, the retrieval of information has taken the form whereby a logic unit for linking is created mainly for text or stationary images, the related information is linked to this logic unit, and when the user has clicked this logical unit, the related information is displayed. However, as for example is represented by MPEG relating to the coding and decoding of moving images, in recent years various techniques have been proposed for processing not only stationary images but also moving images. By handling moving images, the range of contents which can be created in the above hypermedia apparatus such as CAI, many types of presentation, and electronic catalogs is expanded. Hitherto, the use of editing of moving images has been some-what limited to the industrial field such as broadcasting stations. But in the future, it is expected rapidly to become widely available as a system for private use based on personal computers.

Japanese Patent Application No. Hei 4-163589 discloses an image processing apparatus capable of setting logical units (therein referred to as "nodes") for moving images. Setting of nodes for a still image is possible only with a specified display range. For a moving image, this apparatus concentrates on (1) a display range and (2) time, specifying the valid continuity period of the nodes and regional range. Thus, for (1), by selecting with a mouse etc. the regions surrounding a subject appearing in a moving image, the node at that time is set; on the other hand for (2), the valid continuity period of the node is specified according to the time elapsed since the start of the output of the moving image. Therefore, this node is determined uniquely according to the region and the time elapsed, and a link can be made for the related information to each node. After a link is made, when the moving image is actually played, if the user clicks a region on the screen with a mouse etc., a node is pinpointed according to the position and time and the related information is displayed.

In the above apparatus, the setting of regions of logical units was performed manually. However, a moving image differs from a stationary image in that there are of course many frames and the position and shape of the subject are constantly changing. In the NTSC system, thirty frames are required for one second. Thus, even a simple calculation shows that when processing a moving image for one second, thirty settings would be required per one logical unit. For example, when creating contents lasting five minutes, if five logical units are set for one frame, the number of settings would amount to 45,000.

SUMMARY OF THE INVENTION

In consideration of these points, it is the object of the present invention to provide an apparatus which allows labor-saving and simplification in the setting of logical units (referred to as "anchors" in the present application) and more particularly an apparatus for automatically calculating or setting anchor information which has hitherto needed to be carried out for each frame. Another object of the present invention is to provide a moving image hypermedia apparatus and a moving image providing system using this anchor setting anchoring apparatus.

The moving image anchor setting apparatus of the present invention is an apparatus for inputting a moving image and setting an anchor to that image. This apparatus includes a frame determination section for determining a start frame and an end frame of an anchor setting period from among a plurality of frames constituting an inputted moving image, an anchor setting section for, when an anchor region is specified in a standard frame in the anchor setting period, setting anchor information to the standard frame as information relating to the anchor region, and an anchor estimating section for estimating anchor information for a non-standard frame based on the anchor information set for a standard frame.

The frame determination section may determine a standard frame with the earliest time as a start frame and a frame with the latest time as an end frame from among a plurality of standard frames which have been specified in the anchor setting period.

Further, the frame determination section may detect a frame where a target included in a standard frame appears and a frame where the target disappears from among frames preceding or subsequent to the standard frame so as to determine the former frame as a start frame and the latter frame as an end frame.

The anchor estimating section may estimate anchor information for a non-standard frame through interpolation using the anchor information set for a plurality of standard frames.

With this apparatus, setting of anchor information for a non-standard frame is unnecessary. In addition, a user does not need to be aware of an anchor setting period, which can resultantly improve operating efficiency.

According to one aspect of the present invention, the anchor estimating section includes an automatic anchor setting section for selecting a desired number of frames from an anchor setting period between adjacent standard frames to designate these frames as new standard frames, and tracks an anchor to set anchor information with respect to the new standard frames.

With this arrangement, anchor information are needed to be set to only a small number of standard frames at the outset, which makes it possible to reduce burden of anchor setting.

According to another aspect of the present invention, the anchor setting section includes a standard frame deletion section for demoting a standard frame to a non-standard frame when anchor information for the standard frame can be obtained within a given error tolerance through interpolation calculation using anchor information of other standard frames. With this arrangement, the number of standard frames required to hold anchor information can be reduced, thereby making it possible to reduce required memory capacity.

A moving image hypermedia apparatus comprises a frame determination section for determining a start frame and an end frame of an anchor setting period from among a plurality of frames constituting the moving image inputted; an anchor setting section for, when an anchor region is specified in a standard frame in the anchor setting period, setting anchor information to the standard frame as information relating to the anchor region; an anchor estimating section for estimating anchor information for a non-standard frame based on anchor information set; a link setting section for linking anchor information set or estimated to a desired related data; and a link retrieving section for retrieving from a desired anchor related data linked to the anchor.

A moving image providing system according to the present invention comprises a server and a client. The server comprises a section for storing a moving image, anchor information set with respect to a standard frame of the moving image, and related data linked to the anchor information; a section for estimating anchor information for a non-standard frame based on anchor information set for a standard frame; and a section for retrieving from a desired anchor related data linked to the anchor, and the client comprises a section for judging which anchor region was selected when a client selected an object in a moving image, wherein the server retrieves related data linked to an anchor which has been selected and notified thereto, and sends the related data to the client.

DESCRIPTION OF THE PREFERRED EMBODIMENTS

A preferred exemplary embodiment of a moving image hypermedia apparatus of the present invention will now be described. A moving image anchor setting apparatus of the present invention is utilized in this apparatus. According to the present apparatus, for instance with a moving image of an aquarium water tank, CAI software can be simply and effectively created so that when a given fish swimming in the tank is clicked, such information as the name of the fish and a supplementary explanation can be displayed. Hereafter "user" mainly refers to a creator of such contents but it is of course applicable to someone who individually edits a video tape filmed by himself.

EMBODIMENT 1

In this embodiment, a user visibly designates a start frame and an end frame so that an anchor is set using these two frames as an initial standard frame. Here, "frame" refers to a display unit of an image, including a picture in MPEG or the like. The present apparatus automatically calculates anchor information such as position, shape, color of an anchor region in other frames, through interpolation calculation based on the anchor set with respect to the standard frame. "Anchor information" refers to the position or shape of an anchor region, and the color when an anchor region is visibly displayed. Note that the present invention can be achieved with a single initial standard frame, an example of which will be described later.

Figure 1:
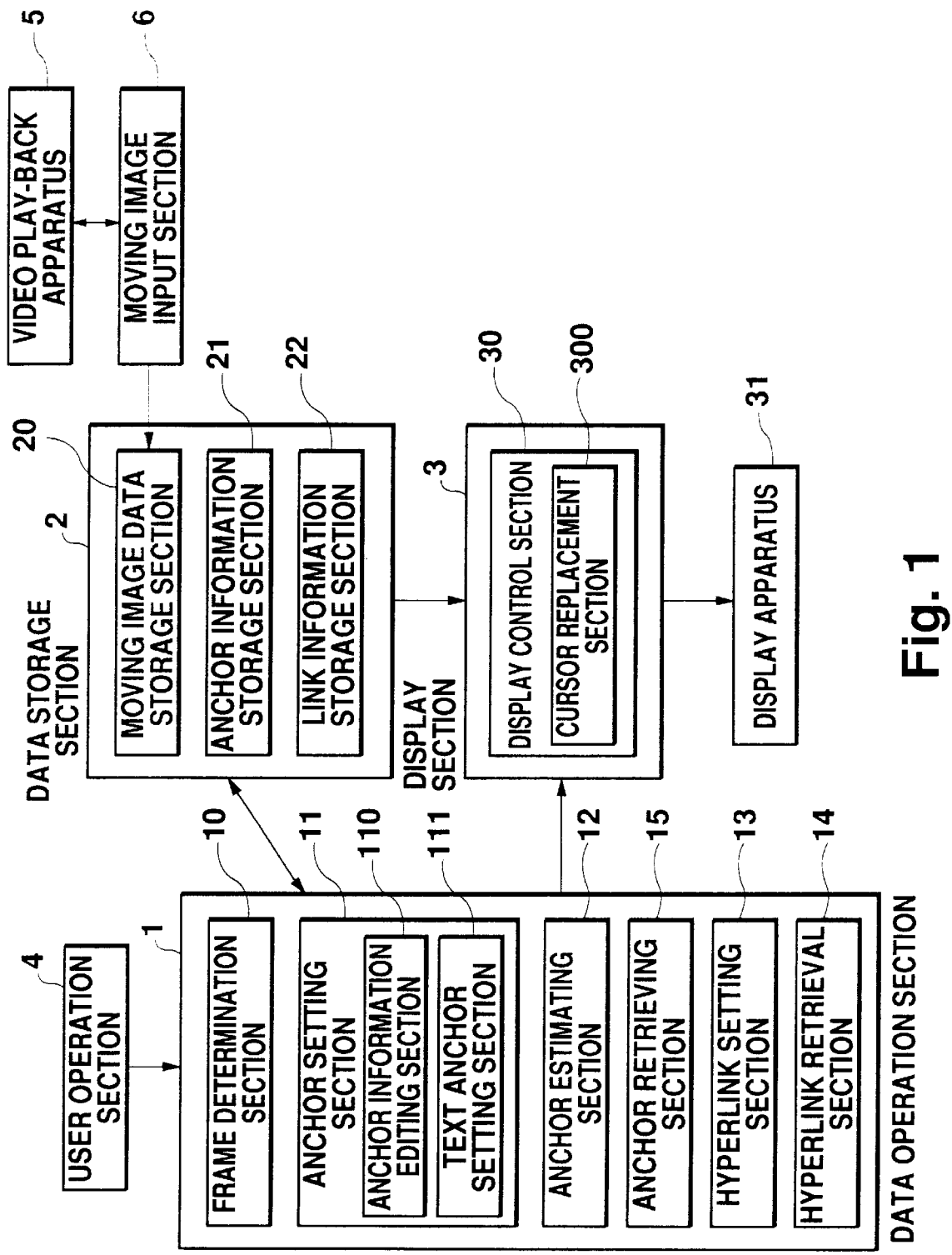
FIG. 1 is a block diagram of a system including a moving image hypermedia apparatus in a first embodiment.

The complete system which includes a moving image hypermedia apparatus of this embodiment comprises a personal computer (hereinafter PC) which controls anchor and link setting processing, and a video play-back apparatus providing a moving image to this PC. This PC has a built-in video capture-board to supplement and digitalize the image provided from the video play-back apparatus. The video play-back apparatus is capable of functions such as play-back from a specified frame or time in addition to the usual functions such as play-back, stop, fast-forward and pause. This type of video play-back apparatus is widely used by broadcasting stations and the like but of course it is not restricted to these. Control of the various functions of the video play-back apparatus is carried out with the aid of a user interface (hereinafter UI) deployed on the PC, for instance "Play Button" displayed on the screen. In this case, when the user clicks this button, the action is transmitted via a signal cable from the PC to the video play-back apparatus. The video play-back apparatus itself is not a requisite constituent of a moving image hypermedia apparatus but is included in the system described here. FIG. 1 is a block diagram of a system including a moving image hypermedia apparatus according to this embodiment.

The present apparatus divides broadly into a data operation section 1 for operating data relating to anchor information and link information, a data storage section 2 for storing this data, a display section 3 for displaying this data in a recognizable shape, a user operation section 4 for carrying out receipt and management of user operations, and a video play-back apparatus 5 on which is played a moving image inputted by a moving image input section 6.

(1) DATA OPERATION SECTION 1

Instructions from the user to the data operation section 1 are carried out by a UI to be explained later. Thus the internal construction referred to hereinafter is a software module.

The frame setting section 10 sets a start frame and an end frame. In this embodiment, the frames designated by a user are used intact as a start frame and an end frame. The example of the start frame and end frame shows the first and last frames of a scene showing a fish tank from the above-mentioned film of an aquarium. If the scene were to move temporarily to a film of the entrance of the aquarium, since there would be no need to set an anchor for the fish, the end frame would be specified before the movement of the scene.

An anchor setting section 11 actually sets the anchor between the start frame and the end frame. For instance when an anchor is set for a fish, first at the start frame a rectangle enclosing the fish is displayed using a mouse and registered as an anchor region. At this time the moving image is in the stop mode. Next the moving image is continued as far as the end frame where the same fish is enclosed a second time and an anchor region is registered. Since the fish is moving and changing direction between the start frame and the end frame, its position and shape usually change. As a result, the shape and position of the anchor region registered at the start frame and the shape and position of the anchor region registered at the end frame do not generally match. The anchor setting section 11 therefore includes an anchor information editing section 110 to be explained below for use when revising an anchor, and a text anchor setting section 111 to set an anchor for text such as a character string.

An anchor estimating section 12 executes interpolation calculation based on the information of the anchors set at the start frame and the end frame, and estimates the size and position of an anchor at a given frame (a non-standard frame). This process will be explained in detail below.

An anchor retrieving section 15 retrieves an anchor based on information regarding the characteristic movement of an anchor included in the anchor information, or anchor distinguishing information. Distinguishing information refers to information which may helps distinguish a particular anchor from other anchors, such as the name of an anchor, an object on which an anchor is set, date or time when an anchor was set.

A hyperlink setting section 13 executes setting of a hyperlink to an anchor that has been set and generates structured data relating to the setting in the form of a table. A hyperlink retrieval section 14 executes retrieval of set link information. In the above examples, the fish anchor and the text data and the like showing the name of the fish are connected by a hyperlink.

(2) DATA STORAGE SECTION 2

The data storage section 2 may be a database, any type of file apparatus or memory apparatus. This is mainly a hardware part.

A moving image data storage section 20 stores moving image data which has been captured at a moving image input section and digitalized. An anchor information storage section 21 and a link information storage section 22 respectively store anchor information and link information.

(3) DISPLAY SECTION 3

A display control section 30 includes a display system program which generally controls the display of all types of image such as moving images during editing or UI, a display circuit such as a VGA controller, and a driver for this. The display control section 30 has a cursor replacement section 300. The cursor replacement section 300 replaces the display state of the cursor when the cursor has entered an anchor region. The output data of the display control section 30 are allocated to a display apparatus such as a PC monitor and the intended display is executed.

(4) USER OPERATION SECTION 4

The user operation section 4 allows the input of commands from a user, and comprises a keyboard, mouse, or any type of pointing device hardware and a command dispatcher. Anchor setting, revision of an anchor region, linking and link retrieval are examples of commands.

(5) MOVING IMAGE INPUT SECTION 6

The moving image input section 6 is a piece of hardware equivalent to a video capture board, having an AD converter and a frame memory (not shown in the drawings) for digitalizing an inputted moving image. The data is then provided to the moving image data storage section 20.

Based on the above structure, first the procedure for setting anchors and links will be explained and then the UI state for anchor setting will be explained.

[1] ANCHOR SETTING

Figure 2:
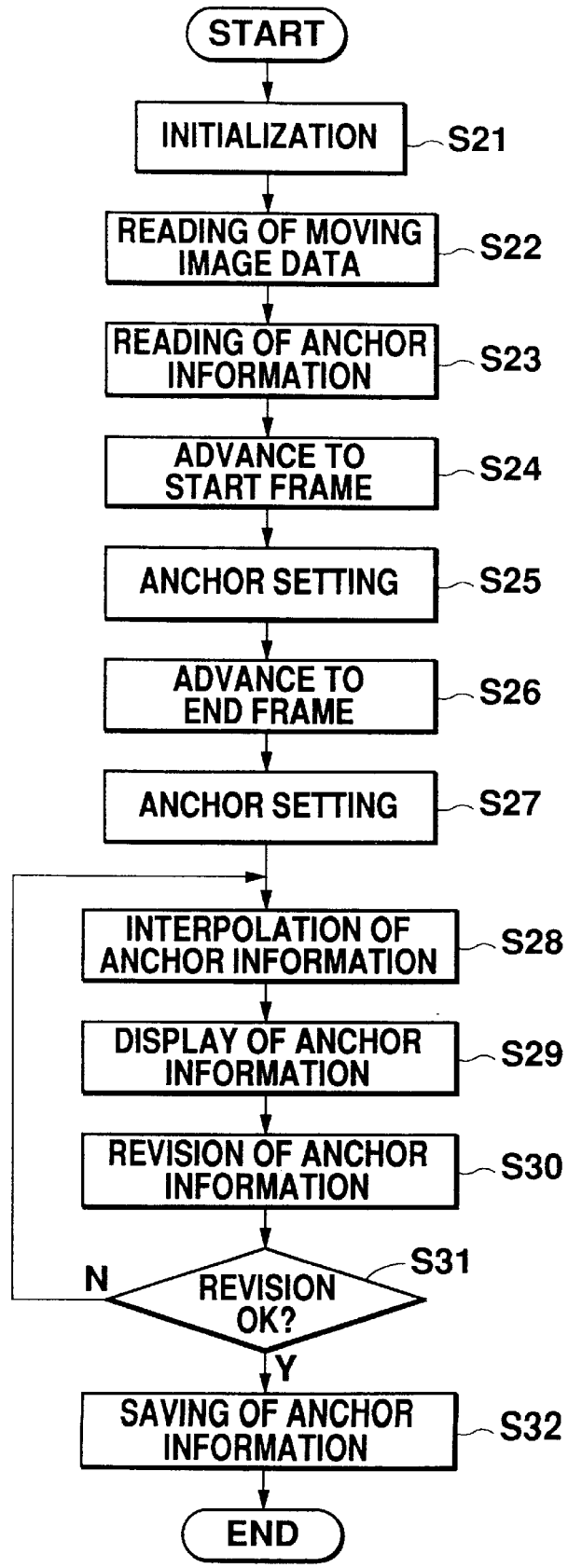
FIG. 2 is a flowchart showing an anchor setting and revision procedure according to the first embodiment.
Figures 3, 4, 5:
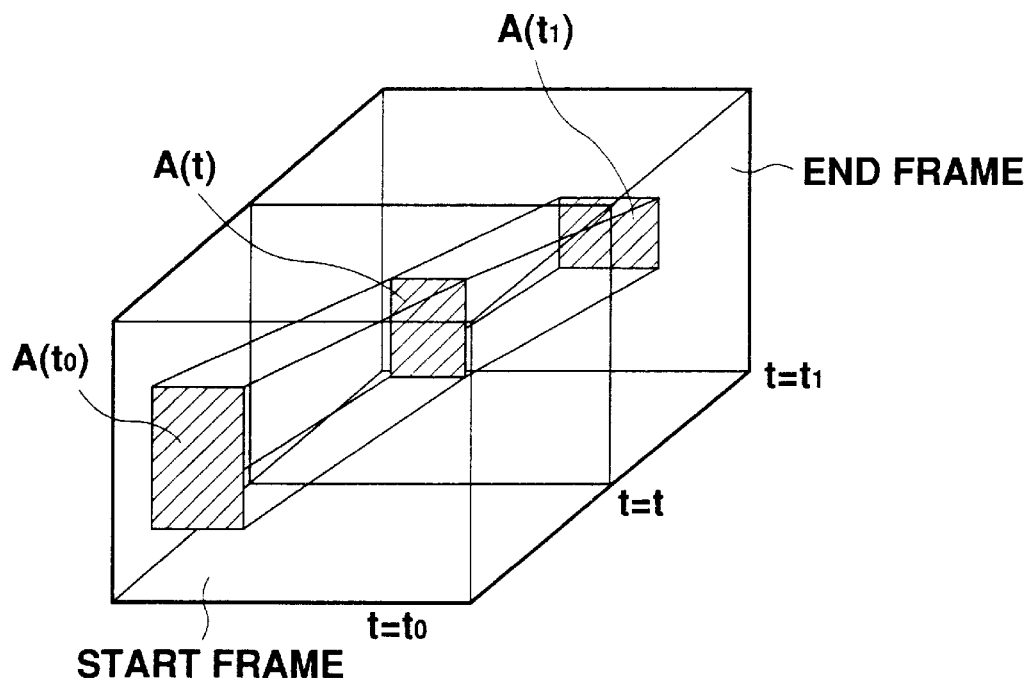
FIG. 3 is a diagram depicting a table of anchor information set in the first embodiment.
FIG. 4 is a diagram depicting an interpolation calculation method for anchor information according to the first embodiment.
FIG. 5 is a diagram depicting a table obtained by adding anchor information of a middle standard frame to FIG. 3.

FIG. 2 is a flowchart showing the anchor setting and revision procedure according to the present embodiment and FIG. 3 is a diagram showing a table of information for a set anchor. As FIG. 2 shows, various kinds of initialization processing are first executed (S21) with respect to the hardware, and the moving image data stored in the moving image data storage section 20 are incorporated (S22). The front frame of the incorporated moving image data is first displayed as a stationary image on a display apparatus 31.

Next anchor information which has already been set for this moving image data is incorporated from the anchor information storage section 21 (S23). If anchor information exists, its anchor region is actually displayed on the screen (hereinafter the mode wherein an anchor region is displayed on the screen is referred to as the "anchor display mode" and the mode wherein an anchor is not displayed as the "anchor non-display mode").

Following this, the moving image data are advanced to the start frame of the time period in which a new anchor is to be set (S24), and when the desired frame appears, the "start frame" button on the screen is pressed and the start frame is registered. This is now in the waiting state for the setting of the anchor region at this frame, and when the user for instance encloses another fish by clicking the mouse, a rectangular region is set. When the rectangular region is fixed, the coordinates of the left upper points (x1, y1) and right lower points (x2, y2) are obtained and recorded as anchor information together with the frame number (numbered consecutively from the front frame of the moving image) of the start frame (S25).

After this, the moving image data are again advanced and stopped when the desired end frame appears (S26) and a rectangular region encircling the same fish is set. Here the setting of the anchor region at the end frame is completed (S27). In FIG. 3 "anchor 1" is the anchor ID showing this fish. The frame numbers of the start frame and end frame (frames 1 and 100 respectively) and the coordinates information for the anchor region are here contained in table form.

When the anchor information at the two outer standard frames has been determined in this way, the anchor information for a frame between them is obtained by interpolation calculation (S28). FIG. 4 is a diagram showing the interpolation calculation method of anchor information. Here, with anchor information A (t0) at start frame (time t0)

anchor information A (t1) at end frame (time t1)

anchor information A (t) at time t $$t1-t0=\Delta t$$

then $$A(t)=\{A(t1)-A(t0)\}t/\Delta t+\{A(t0)t1-A(t1)t0\}/\Delta t \qquad \text{(Equation 1)}.$$

The external shape of the anchor region at a given time is ascertained by substituting A with the x1, y1, x2, y2 values. The general movement of the anchor region is ascertained by substituting the central coordinates of the anchor region. A color number is substituted for A, the change of the color of the anchor region can be tracked. In addition, by internal calculation using equation 1 in a similar way, it is possible to interpolate information which can be expressed numerically. Anchor information for a non-standard frame obtained through interpolation may be added to "anchor 1" region automatically in FIG. 3 or equation 1 calculation for a frame may be carried out each time the display of a frame is prescribed by the user.

When S28 is completed, the anchor information is actually displayed and the contents are confirmed (S29). Now returning to the start frame, the moving image data is played and the anchor region is displayed at each frame by a rectangle. This rectangular region moves continually in compliance with the calculation results.

In the case of "anchor 1," an extremely good result is achieved when the fish moves with constant velocity in a straight line, but in a case where the fish changes direction midway, the anchor region might become misaligned from the fish at a midpoint frame. In such a case, the anchor information is revised (S30). The user first advances the moving image data to a frame with large misalignment and stops the image here. Next, the user clicks the edge section of the anchor region displayed on the screen and alters the shape or position of the region using the mouse. An anchor estimating section 12 promotes a frame revised in this way to a standard frame (hereinafter a frame promoted to be a standard frame is referred to also as "a middle standard frame") and this anchor information is added to the table in FIG. 3. FIG. 5 shows the table obtained when the anchor information of the middle standard frame is added to FIG. 3.

Figure 6:
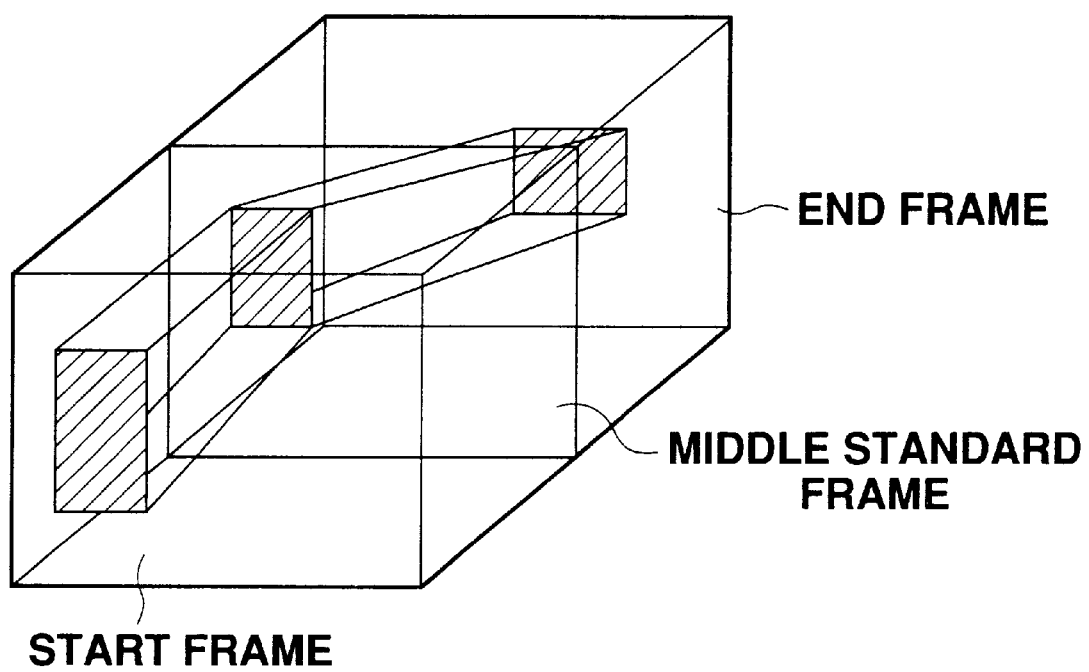
FIG. 6 is a diagram depicting a method of executing interpolation calculation based on the middle standard frame and two end standard frames in the first embodiment.

FIG. 6 is a diagram depicting the interpolation calculation method based on the two end standard frames and the middle standard frame. If the non-standard frame which is the estimate target exists between the start frame and the middle standard frame, interpolation calculation is executed between those frames, and if the non-standard frame exists between the middle standard frame and the end frame, interpolation calculation is executed between those frames (S28). Thereafter, following display in S29 and re-revision in S30 when satisfactory anchor information is obtained (Y of S31) and preserved (S32), the anchor setting process is ended. When an anchor of another frame is revised in S30, of course this frame also becomes a middle standard frame. When two or more anchors are set for a single frame at S25, while automatically replacing the anchor ID according to the setting order within the apparatus, the rectangles of these anchor regions may be displayed in differing colors.

The above procedures produce the following results:

1. The anchor setting is executed only at the two outer standard frames and setting operation for the many frames existing between these is not necessary.
2. When a misalignment of the anchor position has occurred during interpolation calculation, this misalignment can be confirmed. Therefore, since frames needing to be revised are easily identified and once a frame has been revised it is automatically promoted to a middle standard frame, the user need not worry about matters such as whether or not to use a standard frame.
3. For instance even in a case in which a fish for which an anchor has been set swims in an arc, if revision is executed for just a few frames in addition to the two outer standard frames, it will be possible to obtain sufficiently good anchor information.

The above is an outline of the moving image hypermedia apparatus in the present embodiment and in particular of the moving image anchor setting apparatus.

[2] LINK SETTING

Figure 7:
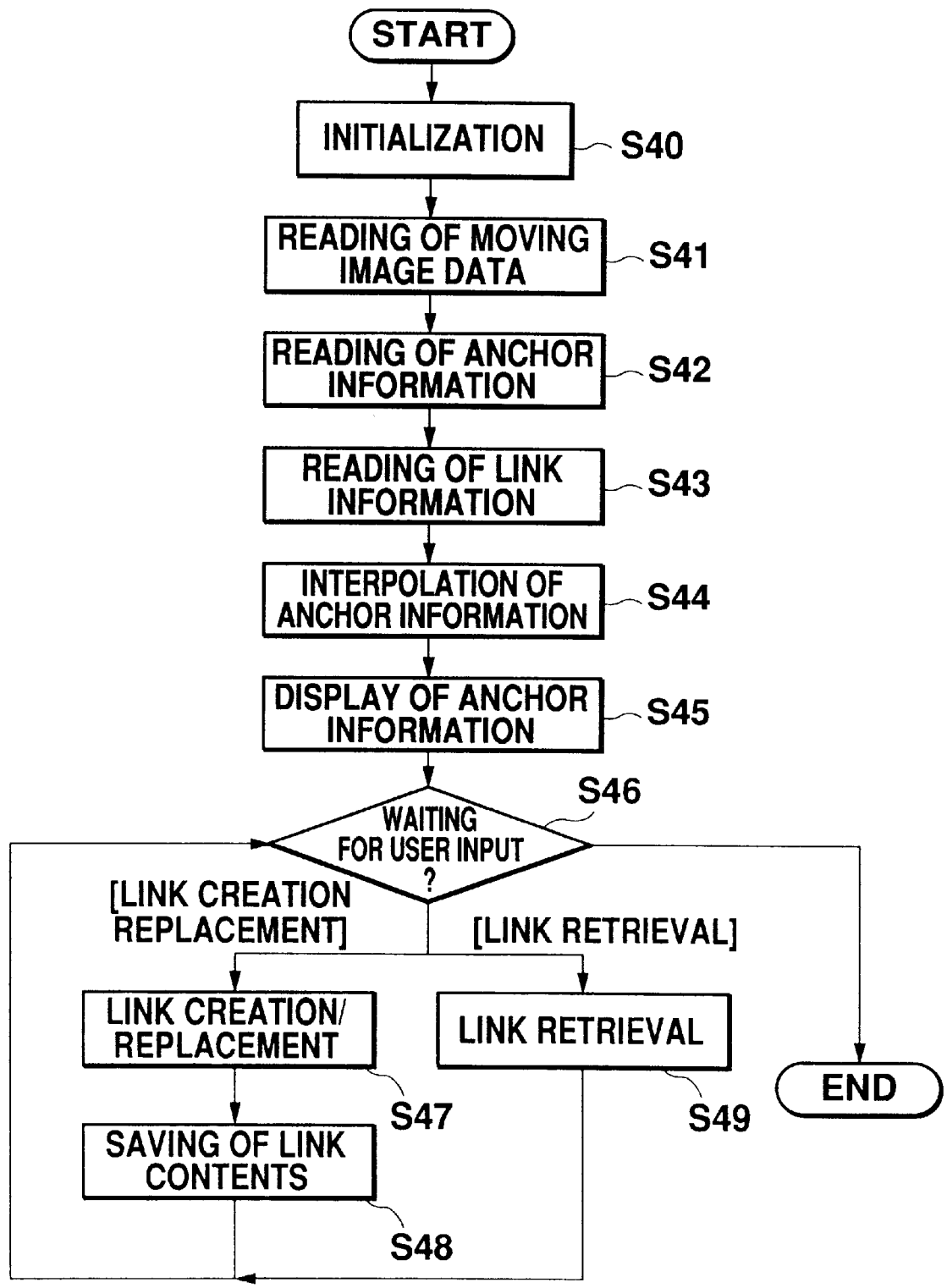
FIG. 7 is a flowchart showing a link setting and retrieval procedure according to the first embodiment.
Figures 8, 9:
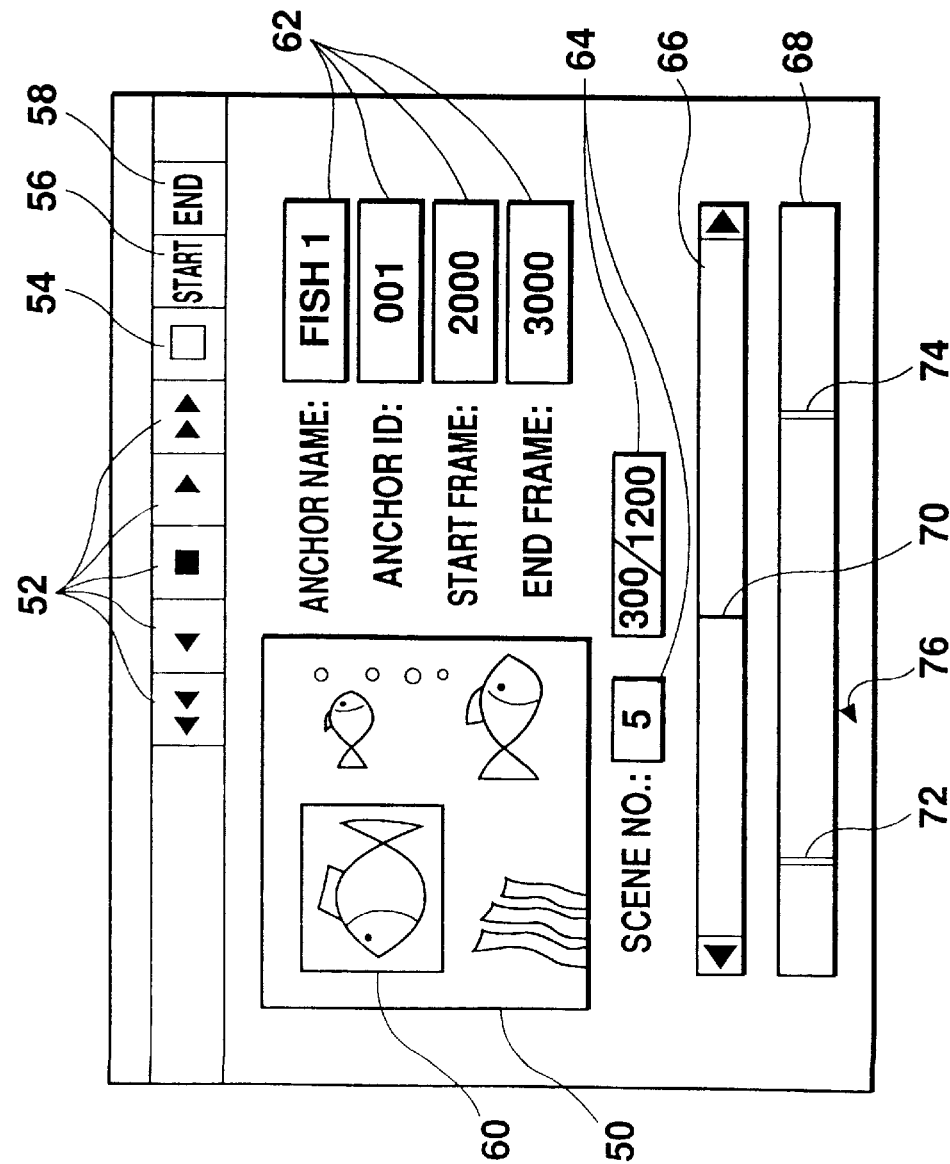
FIG. 8 is a diagram depicting a link information table in the first embodiment.
FIG. 9 shows an example of a UI screen for anchor setting.

Description will now be given of link setting for an anchor that has been set. FIG. 7 is a flowchart showing the link setting and retrieval procedures according to the present embodiment and FIG. 8 is a diagram depicting a table of information for a link that has been set.

FIG. 7 shows the procedure order when anchor setting and link setting are executed completely independently. As in FIG. 2 various kinds of initialization processing are first executed (S40) and the moving image data are incorporated (S41). Next as the anchor information which was set in [1] is incorporated from the anchor information storage section 21 (S42), link information that has already been set is incorporated from the link information storage section 22.

Next, while determining the anchor information of another frame by interpolation calculation based on the anchor information of the two outer standard frames and the middle standard frame (S44), the anchor information is continually displayed in synchrony with the play-back of the moving image (S45). This is now in the waiting state for input from the user at the user operation section 4 (S46).

Here on a moving image or after pausing a moving image, if the user clicks an anchor region and presses the "Create/Replace Link" button, the creation of link information for that anchor is executed (S47). For instance, when a fish in an aquarium is clicked, the candidate information such as a text or an image to be linked to that fish appears on the screen, then the text or the like which the user has chosen is linked to the anchor of the fish (more precisely, to the fish as an object included in the anchor). In a case where there are no candidates, the user himself can input a character string and link this. FIG. 8 shows a state wherein information in text format "anchor1. txt" has been linked to an anchor "anchor1" and a bit-map image "anchor2. bmp" has been similarly linked to an anchor "anchor2". When the link information has been determined in this way, the contents of the link are preserved in the link information storage section 22 and the state returns to waiting for user input.

If in S46 the user presses the "link retrieval" button and specifies an anchor, the link information corresponding to that anchor is retrieved and displayed (S49). In FIG. 8 for instance, for the fish in anchor 1, the name and length and other characteristics of the fish are displayed by a character string, and for the fish in anchor 2, information such as a photograph of the sea in which the fish actually lives is displayed. Since the link operation can be confirmed from this display, the user can complete the creation of contents at this point. The contents can also be merchandised, for instance by preservation on a recording medium such as a CD-ROM. When shipped as merchandise, the anchor region is generally replaced with a non-displayed anchor non-display mode.

The anchor and link settings have here been described as independent processes, but for instance by creating a "return to anchor setting" button to be displayed on the screen during link setting, it becomes possible to change freely between the two processes and editing is made easier.

[3] UI fOR ANCHOR SETTING

FIG. 9 is a diagram showing an example of a UI screen for anchor setting. In the diagram, the moving image to be the object of the process is displayed in an image display region 50. The top row of black buttons 52 are the object buttons which give direct instructions to the video such as play-back and stop. Next to these are a rectangular button 54 to set an anchor region for a frame displayed in the image display region, and similarly a start frame specification button 56 and an end frame specification button 58 for specifying a displayed frame as a start frame or an end frame. In the diagram, an anchor region 60 has been set for one of the fish.

On the center right side of the screen is an anchor-related box group 62 to display the name, ID, start frame number, and end frame number of the anchor to be set or revised. Below the image display region 50 is a scene-related box group 64 for displaying the number of the scene including the frame presently being displayed and the serial number of the frame within the scene. Below this is a box 66 for moving an image very slightly forward or backward when editing. The image moves forward when the button on the right end is pressed and backward when the button on the left end is pressed. The position of the frame presently being displayed within the scene is being displayed by a vertical line 70. Below this box is a box 68 to display the positions of the start frame and end frame within the scene. The positions of the start frame and end frame are displayed respectively by the double vertical lines 72 and 74, and the position of the middle standard frame between these is being displayed by a triangular symbol 76.

In the same diagram, using the scene number as a pointer, the user first advances the video tape as far as the front of the scene for which he wishes to set an anchor. In this case for instance in a film of an aquarium comprising a plurality of scenes, the film has proceeded to scene No. 5 showing a fish tank. Here the user presses the right end button of box 66 and advances the moving image by one frame at a time. When the first frame of the anchor which is to be set appears, the user presses the start frame specification button 56 and registers this frame. Now the double vertical line 72 displaying the position of the start frame appears at the corresponding place in box 66. Here the user presses the rectangular button 54 and in the image display region 50 clicks the left upper point and right upper point of the anchor region he intends to set with the mouse. This ends the anchor setting for the start frame. Thereafter the moving image is advanced and in the same way the end frame is registered and an anchor set.

When it detects the completion of the setting at the two outer frames, the anchor estimating section 12 of the present apparatus automatically substitutes the anchor information into equation 1 and begins calculation. Here when the user for instance returns to the start frame and advances the moving image one frame at a time, the anchor estimating section 12 determines the time corresponding to the frame presently being displayed and displays an anchor region based on an estimated result corresponding to this time. If the anchor region displayed is misaligned, the user again presses the rectangular button 54 and executes revision of the region. After revision, the triangular symbol 76 appears at the point corresponding to this frame. Since this UI actually displays the anchor information on the moving image data, editing results can be confirmed at real time and revisions can be simply executed.

The above is an outline of the present embodiment. The following refinements and alterations and the like are envisaged in regard to the present embodiment.

(1) TEXT ANCHOR SETTING

Text anchor setting is executed by the text anchor setting section in FIG. 1. First on the screen, text data is edited and superimposed on the moving image and an anchor is set. A single region from a played-back image is not specified as in a normal anchor setting, but a created text is placed on the image and an anchor region is set enclosing this text as appropriate. Methods such as directly inserting annotation onto a video film for instance have hitherto been generally used, but in such cases, subsequent deletion of the annotation when re-editing is awkward. The present embodiment resolves this difficulty.

When a text anchor has been set, the anchor information is also stored in the anchor information table. However, in the table shown in FIG. 3, "frame" changes to "text" and a text name is entered in the column.

Linking of related information is also possible for a text anchor. For instance for the aquarium scene in FIG. 9, a text "Fish of the South Seas" may be pasted, to which a text such as "There are many brightly colored fish in the South Seas . . . " can be linked.

(2) REPLACEMENT OF CURSOR DISPLAY STATE

Replacement of the cursor display state is executed by the cursor replacement section 300 in FIG. 1. This function is particularly useful for an anchor non-display mode, for instance when the contents are to be used by the end users. In order to execute this function, the cursor replacement section 300 has a position acquisition program for acquiring the cursor position at any time, a judgment program for judging whether an acquired position is included in one of the anchor regions, and a replacement program to decide in what way the display state of the cursor is to be replaced when the cursor has entered an anchor region and to actually replace the shape or such feature of the cursor according to this decision.

When replacing a cursor, there are cases in which it is not intended to change the replacement contents for each anchor and cases in which it is intended. In the former, there is for instance a method for replacing a cursor ordinarily shown as a + symbol with ⊚ or for increasing the cursor brightness. This aspect is particularly beneficial in cases where the movement and shape of the target are changing rapidly and the changes of the anchor region are severe.

In the latter case, it is envisaged that the anchor ID of the anchor region into which the cursor has entered is retrieved from the replacement program and is displayed in the cursor position instead of the cursor. For instance, when the cursor has entered the anchor region of a certain fish, the contents of the anchor target can be displayed with the cursor as a "shark" or suchlike. According to this mode, the user can learn the name of a fish without even needing to click the fish.

(3) CLEAR SPECIFICATION OF MIDDLE STANDARD FRAMES

In the present embodiment, the two outer frames were first determined, but a case requiring revision is conceivable such as a case in which the movement of a target is erratic. In such a case, from the outset, frames other than the start frame and end frame also receive clear or intentional anchor region specification. For instance in the UI in FIG. 9, in addition to the start frame specification button 56 and the end frame specification button 58, a middle standard frame button may be provided. Since this frame is used as a standard frame from the outset, interpolation calculation can be regarded as starting from the state shown in FIG. 6.

(4) NON-RECTANGULAR ANCHOR REGIONS

Anchor regions need not be limited to rectangles. For instance in the case of a circle or an ellipse, a region may be specified according to the three coordinates of the major axis, the minor axis, and the center. For a polygon, the coordinates of each vertex may be used. When the perimeter itself of a target is to be the anchor region, the region can be specified according to a coordinate of one point above the perimeter and a chain code expressed from that point.

(5) ADOPTION OF NON-LINEAR INTERPOLATION

In the present embodiment, for maximum simplicity, linear interpolation was used, but of course non-linear interpolation is acceptable. The equation used for interpolation can be determined according to experiments tailored to the characteristics of the moving image to be processed.

(6) DETERMINATION OF START AND END FRAMES

In the above embodiment, start and end frames are prescribed by a user, though the following method may also be applicable.

1. The user simply specifies frames and sets an anchor without being aware which ones are start and end frames. The specified frames are used as standard frames. The frame determination section 10 determines a frame with the minimum frame number of the frames to which the user have set an anchor as a start frame, and one with the maximum frame number as an end frame. In this case, the start frame specification button 56 and the end frame specification button 58 of FIG. 9 are unnecessary.

2. The user specifies one frame and sets an anchor to that frame. The user further specifies a target to which an anchor has been set. This frame is used as a standard frame. By checking preceding and subsequent frames of the standard frame, the frame determination section 10 detects a frame in which that target appears and a frame in which it disappears, and respectively determines them as a start frame and an end frame.

Existence or non-existence of a target is judged through image matching. That is, using the target specified by the standard frame as a model, a matching process is executed with respect to the preceding and subsequent frames. The range of a frame for the detection may be extended to the farthest preceding or subsequent frames of the standard frame whose image matches that of the standard frame. When images no longer match, start and end frames are then determined. According to this method, a standard frame to be determined at the outset may be a single frame.

(7) THREE-DIMENSIONAL DISPLAY OF AN ANCHOR REGION

The anchor setting section 11 is provided with a function for three-dimensionally displaying a set anchor region by developing the region in the horizontal x and vertical y directions of a screen and time t. This may be interpreted that FIG. 4 is displayed intact on the screen while editing an anchor. As a result of this displaying, the user can visually understand the overall anchor.

Note that, as an applied example of this technique, three-dimensionally displayed anchor information may be directly edited. For instance, the anchor region in the middle standard frame in FIG. 4 is moved to left on the screen and a display such as in FIG. 6 is shown. The user can learn the effect of editing in a real time basis.

(8) CROSS SECTIONAL DISPLAY OF A MOVING IMAGE

The anchor setting section 11 is additionally provided with a function for creating a horizontal cross sectional view (FIG. 10a) and a vertical cross sectional view (FIG. 10b) of the track of an anchor region from the start frame to the end frame and for displaying those views.

Figure 10A:
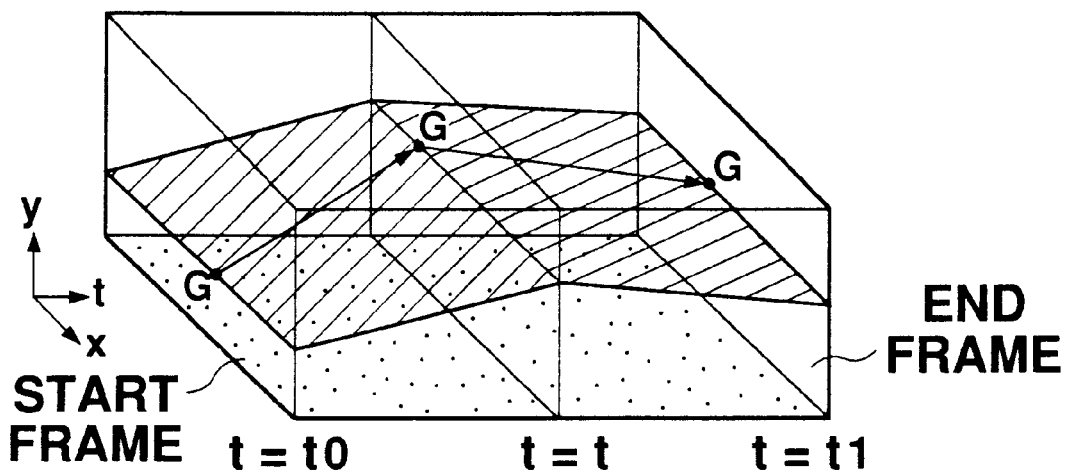
FIG. 10a is a cross sectional view in the horizontal direction showing a track of an anchor region from a start frame to an end frame.
Figure 10B:
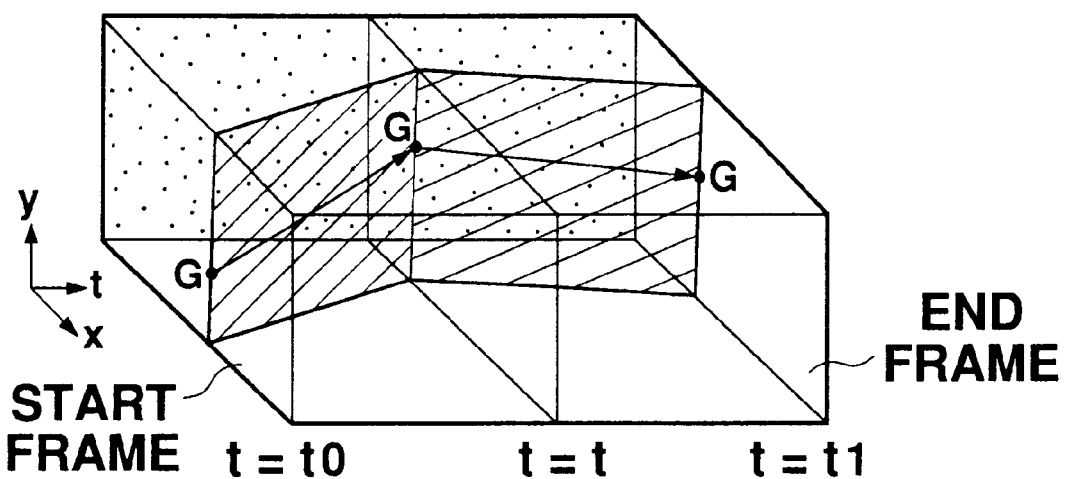
FIG. 10b is a cross sectional view in the vertical direction showing a track of an anchor region from a start frame to an end frame.

First, x and y coordinates of the center of gravity G of the anchor region are obtained from the anchor information of the standard frame. In the case of FIG. 10a, a straight line parallel to the X axis is drawn through the center of the gravity on the frame. Between adjacent standard frames, a plane including these straight lines (the section with slanted lines in the drawing) is provided so that the moving image is cut along this plane. The thus obtained cross sectional view is projected onto the x-t plane (the section with dots in the drawing). In the case of FIG. 10b, the same process is executed as in the above, but with x and y exchanged. When the track of the anchor is correctly calculated, that is, when anchor information for a non-standard frame is estimated with a high accuracy, the moving path of the anchor should appear in the two projected views. For instance, provided that a red ball is an object to which an anchor is set, a moving path of a red line will appear on the cross sectional views of the moving image. This is the same as a case where the lead of a pencil halved in the longitudinal direction appears as a straight line. If this moving path becomes thick or missing midway, the anchor position at that point may be revised.

(9) GROUPING OF ANCHORS

The anchor information editing section 110 is additionally provided with a function for grouping anchor information separately set so as to deal with them as a supposed single anchor. For instance, in a case where a person A exists within a screen in frames N1 to N2 and N3 to N4, and does not exist in frames N2 to N3, the anchors regarding the person A in frames N1 to N2 and frames N3 to N4 are handled as a single anchor. This allows reduction of the burden in setting or revising anchor information. In addition, it is also possible to group a person A and a person B appearing in the same frame.

(10) LISTING OF ANCHOR INFORMATION

The anchor information editing section 110 is additionally provided with a function for listing anchor information for a moving image which is currently processed. For instance, anchor names such as "FISH 1," "FISH 2," may be listed along with the title of a moving image "AQUARIUM" on a screen. It may be structured such that, when a user selects the name of an anchor whose content the user wishes to confirm, a relevant moving image is replayed from the start frame of he anchor.

(11) ANCHOR RETRIEVAL

An anchor information retrieval UI is provided. Upon input of character information such as an anchor name to be retrieved as a keyword, the anchor retrieving section 15 retrieves information including that keyword from information stored in the anchor information storage section 21. Alternatively, the movement of an anchor region may be used as a retrieval key. As an example, when a user wishes to find an object moving to the right, the user presses, for instance, the button "→" using the retrieval UI. The anchor retrieving section 15 calculates the track of respective anchor regions and retrieves and displays anchors including an object moving to right.

EMBODIMENT 2

In the first embodiment, calculation of anchor information was executed automatically mainly by interpolation and revision was executed manually. In this embodiment, based on an analysis of a moving image, an apparatus automatically sets an anchor beforehand using a certain number of frames as standard frames, and utilizes the interpolation method of the first embodiment between these standard frames. In this aspect, since a frame equivalent to the middle standard frame of the first embodiment exists from the outset, the manual labor required for revision is reduced.

Figure 11:
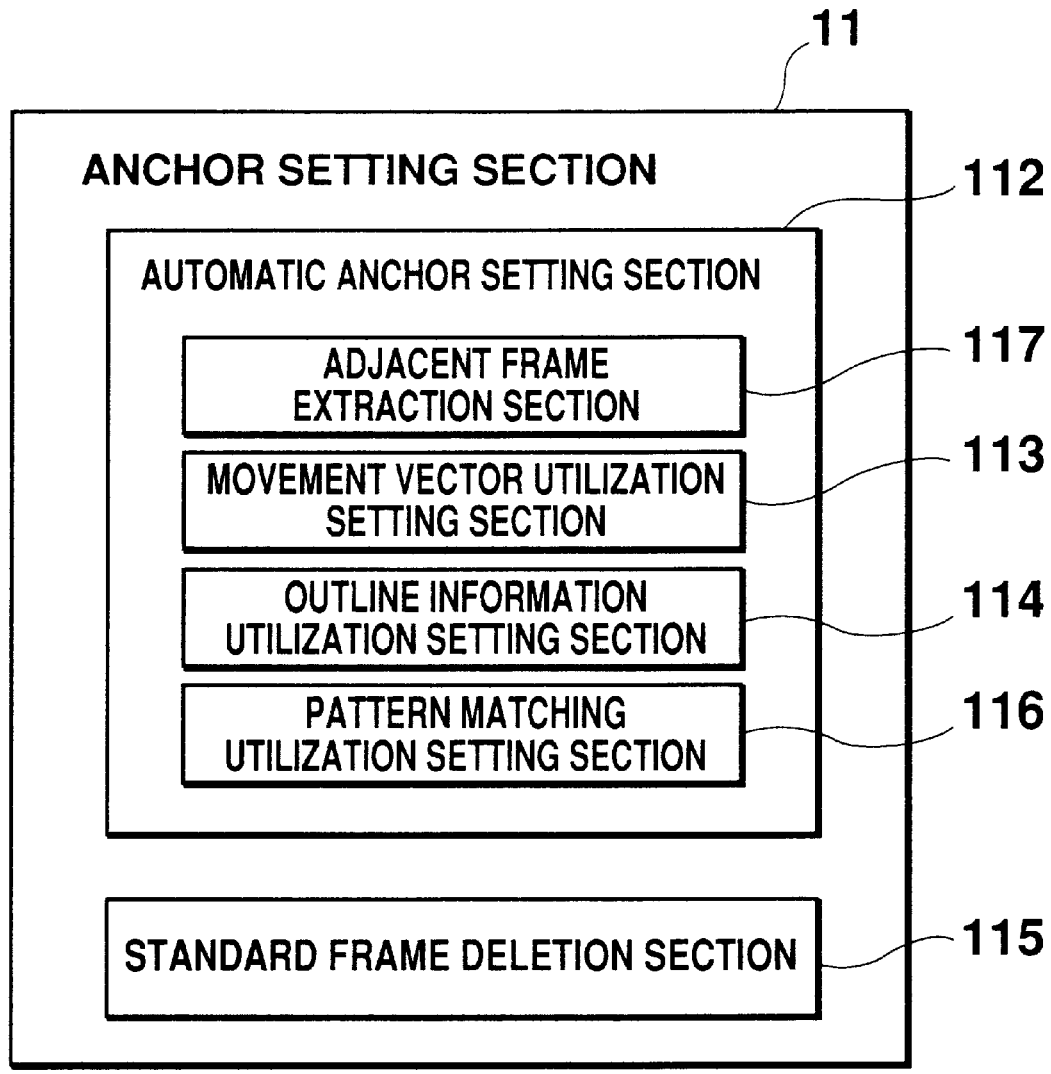
FIG. 11 is a block diagram of an anchor setting section of a moving image hypermedia apparatus in a second embodiment.

FIG. 11 is a block diagram of an anchor setting section 11 of a moving image hypermedia apparatus of the present embodiment. Other than the anchor setting section 11, the configuration is the same as shown in FIG. 1.

In FIG. 11, an automatic anchor setting section 112 has an adjacent frame extraction section 117. The adjacent frame extraction section 117 selects non-standard frames in a constant interval between adjacent standard frames, and promotes the non-standard frames to standard frames. The automatic anchor setting section 112 further includes a moving vector utilization setting section 113, an outline information utilization setting section 114, and a pattern matching utilization setting section 116. Hitherto only one of these three setting sections may be implemented, but in the present embodiment, all of them are implemented so that any one of them can be selected to suit the given circumstances.

Furthermore, as will be explained below, the standard frame deletion section 115 returns to non-standard frames those frames among the frames set by the automatic anchor setting section 112 which are redundant. In the following, the operation with the above structure will be described.

[1] AUTOMATIC ANCHOR SETTING USING MOVEMENT VECTORS

The feature of this process lies in a two level process for increasing the tracking precision of the anchor by first determining the movement vector of the anchor from the start frame to the end frame, and then in due course judging the agreement between the supposed movement path of the anchor and the movement vector.

1. OBTAINING A MOVEMENT VECTOR

The times of the start frame and end frame are given as t0 and t1 respectively. In addition to these, some of non-standard frames are first replaced with standard frames by the adjacent frame extraction section 117. For simplicity, every other five frames are replaced, and hereafter the time-lapse between standard frames is normalized as 1. In order to determine the movement vector of a specific anchor in the period from the start frame to the end frame, block matching is executed with an image region near to the center of the anchor as a block. A frame corresponding to a given time t is here expressed as frame (t).

Figure 12:
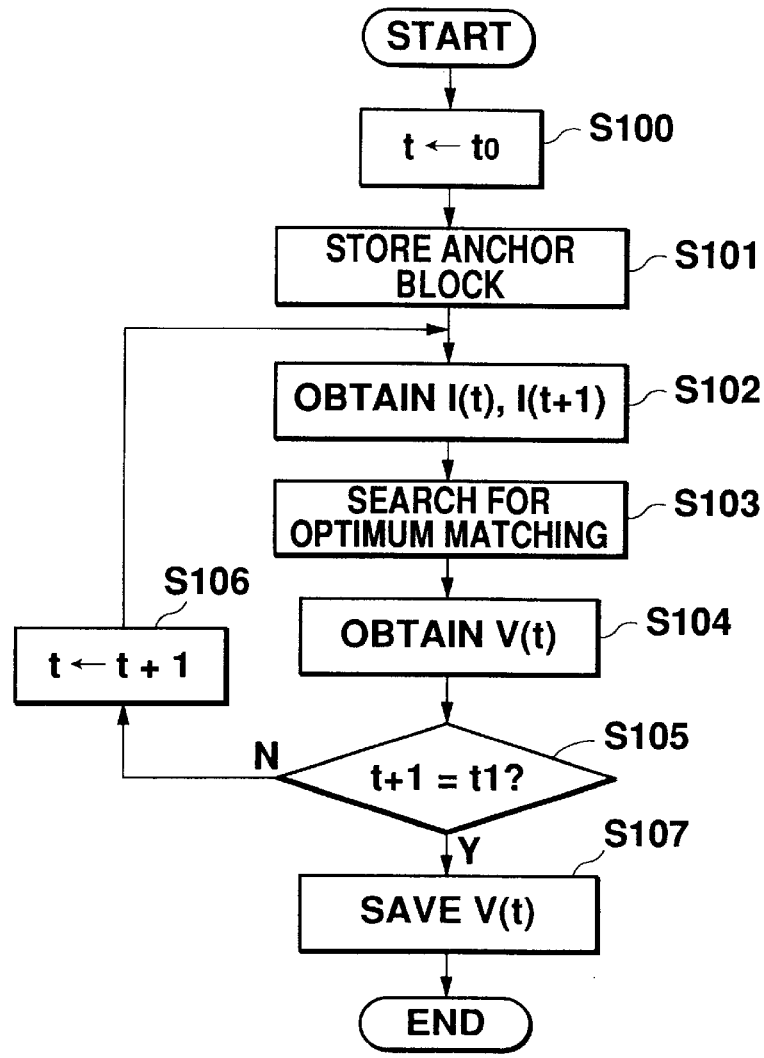
FIG. 12 is a flowchart showing an acquisition procedure for a movement vector in the second embodiment.

FIG. 12 is a flowchart showing an acquisition procedure for a movement vector in the present embodiment. As shown in the diagram, a time counter t is first set at t0 (S100). Next, the anchor for which the movement vector is to be obtained is specified from among the anchors set at the start frame. The movement vector utilization setting section 113 stores the region including the center of the specified anchor as a block to be used for block matching (hereinafter referred to as an "anchor block") (S101). Next, the image data I (t) of frame (t) and the image data I (t+1) of frame (t+1) are obtained (S102). I (t) is the collective data of the pixel values p for each of the pixels included in the frame.

Following this, the optimum matching is searched for while moving the anchor block within the frame (t+1) (S103). Since all the pixel values for the anchor block itself are identified from I (t), the anchor block is placed at a given point in the frame (t+1) so that the square deviation of the pixel values is calculated from the overlapping pixels. This is integrated within the entire anchor block region. This integration is executed while gradually moving the anchor block, and the position where the integration value is lowest is judged to be the motion target (destination) of the anchor block.

Once the motion target has been identified, since the motion quantity and motion direction from the anchor block at frame (t) to the anchor block at frame (t+1) are confirmed, this motion quantity and direction is expressed as a motion vector V (t) (S104). Here, it is judged whether or not t+1 has reached the time t1 of the end frame (S105) and if it has not been reached, t is incremented (S106) and the movement vector is repeatedly obtained. Once t+1 is equivalent to t1, the V (t) hitherto obtained is preserved (S107) and processing ends.

Figure 13:
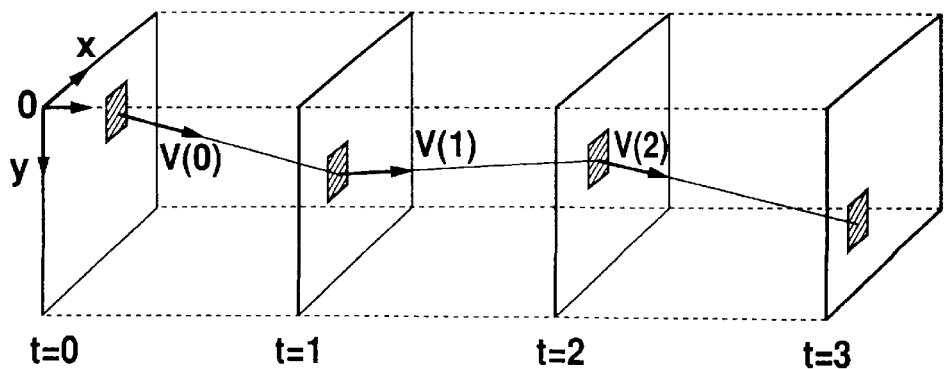
FIG. 13 shows an example of a movement vector V (0)~V (2) obtained when t0=0, t1=3 in FIG. 12.

FIG. 13 shows an example of a movement vector V (0)~V (2) obtained when t0=0 and t1=3. As the diagram shows, V (t) can be expressed by the three components (x, y, t) according to x and y determined by the length and breadth on the screen and t determined by time direction.

2. JUDGMENT OF AGREEMENT LEVEL

Figure 14:
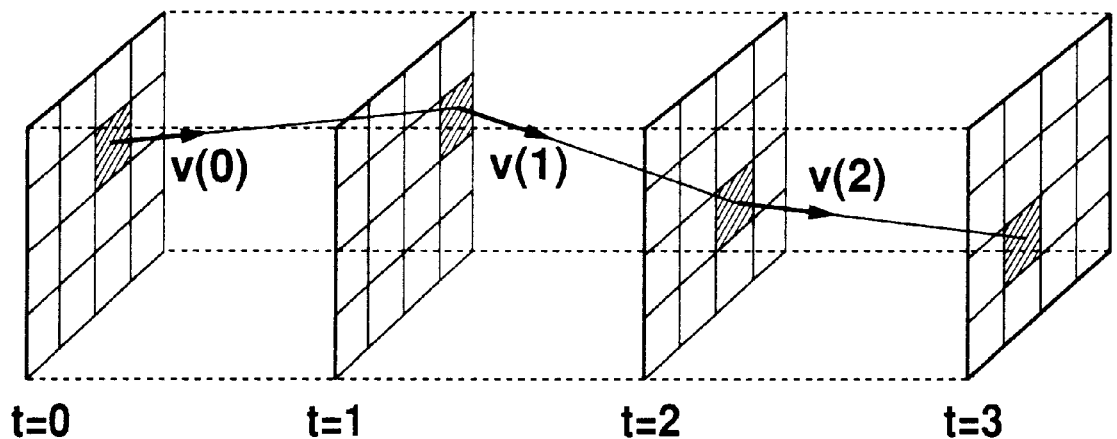
FIG. 14 is a diagram depicting one of the paths which the anchor might have followed.

Each frame is divided into blocks of similar size as the anchor blocks created when the movement vector is obtained, and all paths which the anchor could have followed are picked out. FIG. 14 is a diagram depicting one of these paths. In this diagram, the frames are divided into 16 blocks, and the starting point of the path at the start frame and the end point of the path at the end frame are in agreement with the anchor block shown in FIG. 12. Under these conditions, all paths will thus be 16×16. Next, in each section of these possible paths (hereinafter "supposed paths"), the vector v (t) shown in FIG. 14 (hereinafter "path vector") is defined. The path vector is determined by the direction when following a supposed path from one frame to the next frame. v (t) is also described with the 3 components (x, y, t).

The angle formed in each section by V (t) and v (t) is defined as θt, and f (t)=cos θt is calculated according to the following equation using the inner product.

$$f(t)=(V(t),v(t))/|V(t)|\cdot|v(t)| \quad \text{(Equation 2)}$$

Figure 15:
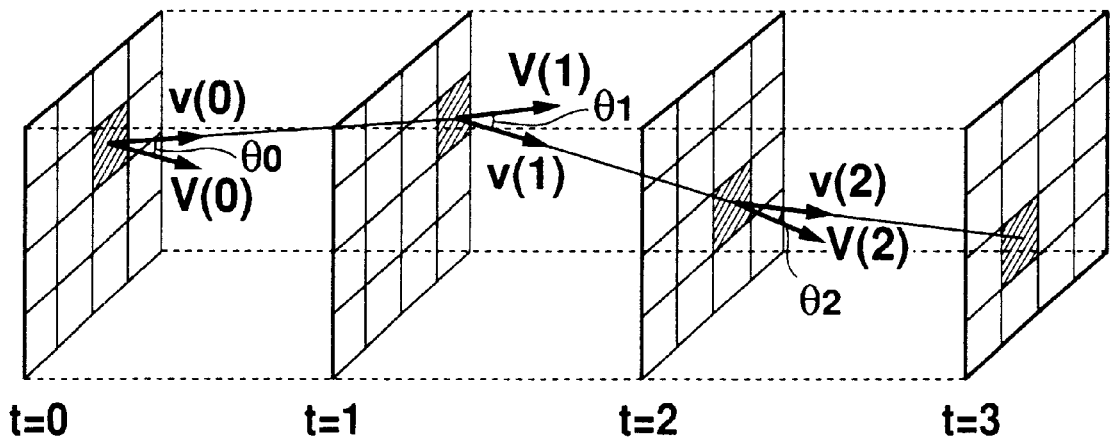
FIG. 15 is a diagram showing V (t) of FIG. 13 added to v (t) of FIG. 14.

FIG. 15 is a diagram depicting V (t) of FIG. 13 added to v (t) of FIG. 14, showing the meaning of θt. When f (t) of equation 2 is greater, the level of agreement between the supposed path and the movement vector in that section is higher. But even if the level of agreement in one section is at maximum, if the levels of agreement in the other sections are extremely low, the level of agreement for the whole must be regarded as low. Here, while including the level of agreement at each section, the following evaluation equation is introduced in order to evaluate the level of agreement of the whole:

$$g(t)=\max\{f(t-1)+g(t-1)\} \quad \text{(Equation 3)}$$

A supposed path having the highest level of agreement until that time can usually be pinpointed by recurrently calculating equation 3. Since the supposed path having the highest level of agreement for the whole can be pinpointed if this calculation is executed right up to the end frame, this path is regarded as the motion path of the anchor. Thereafter, automatic anchor setting is executed, assuming that an anchor at that time exists at an intersection between this motion path and each of the respective standard frames. The set anchor information may be added to the anchor information table shown in FIG. 3. Note that anchor information for frames other than standard frames may be successively determined through interpolation calculation according to the same method as the first embodiment.

[2] AUTOMATIC ANCHOR SETTING BASED ON UTILIZATION OF OUTLINE INFORMATION

As another method of automatic anchor setting, an anchor can be tracked based on the motions of the outline of a target. At the outline information utilization section 114, an outline image of each frame is generated by the same repetition process shown in FIG. 12. An outline image is composed of pels that have either zero or one as their values. If the pels on the outline are to have one as their values, other pels would have zero as their values. The outline image can be generated with a compass-gradient-type filter or such like. When the outline image is determined, anchor tracking can thereafter be executed, taking the anchor motion as identical to the motion of the target.

[3] AUTOMATIC ANCHOR SETTING BASED ON UTILIZATION OF MATCHING

Figure 16:
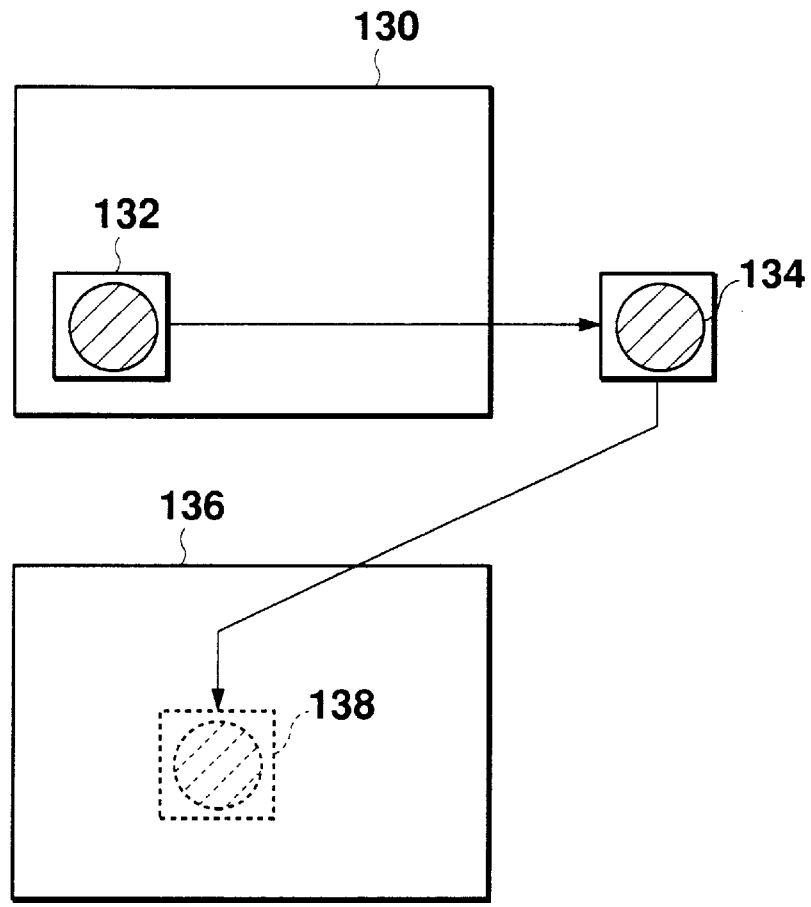
FIG. 16 is a diagram depicting an automatic anchor setting method using pattern matching in the second embodiment.

As a further method of automatic anchor setting, an anchor is tracked using pattern matching shown in FIG. 16. Also, in this method, the adjacent frame extraction section 117 first presets some standard frames. Next, a model 134 for pattern matching is made based on an anchor region 132 which has been set on the start frame 130 so that a region with the highest agreement level is obtained in adjacent standard frames 136. As a pattern matching method, a template matching method in which a model image data are overlapped intact, and a structure matching method in which image data are overlapped according to positional relationship among characteristic points extracted from an image, or the like are available. Pattern matching is executed around the center of the model.

When a region 138 is obtained in the second standard frame, an anchor region is further tracked by repeating the same process using the obtained region 138 as a new model. In a case where movement or deformation of a target is rather significant or a set interval between standard frames is too large, a good matching result may not be obtained. In such a case, the adjacent frame extraction section 117 sets more standard frames with a shorter intervals between standard frames and executes matching processing again.

[4] DELETION OF UNNECESSARY STANDARD FRAMES

In the above example, a standard frame was set every five frames. However, for instance when a target moves in a straight line at constant velocity, a start frame and end frame alone are sufficient. Even in a case in which a target is not moving in a straight line at constant velocity from the start frame to the end frame, for the period during which it does move in this way, only two outer standard frames are needed. As the number of standard frames decreases, the calculation is consequently less laborious. In the above [1] case, since the number of supposed paths also decreases, it is especially advantageous.

Figure 17:
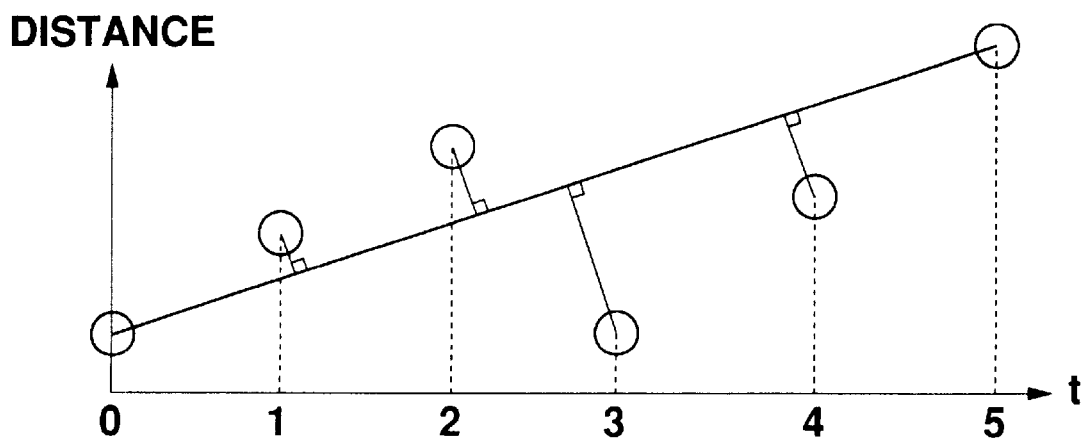
FIG. 17 is a diagram depicting the deletion of a standard frame in the second embodiment.
Figure 18:
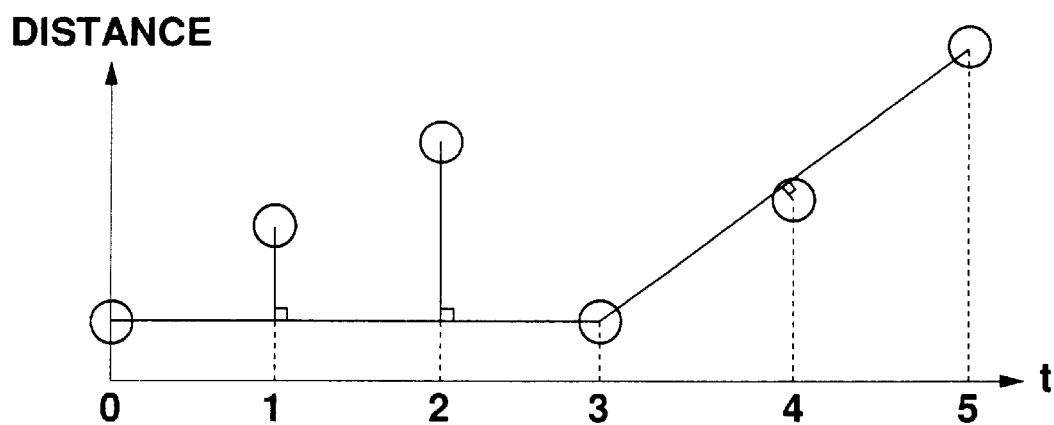
FIG. 18 is a diagram depicting the deletion of a standard frame in the second embodiment.
Figure 19:
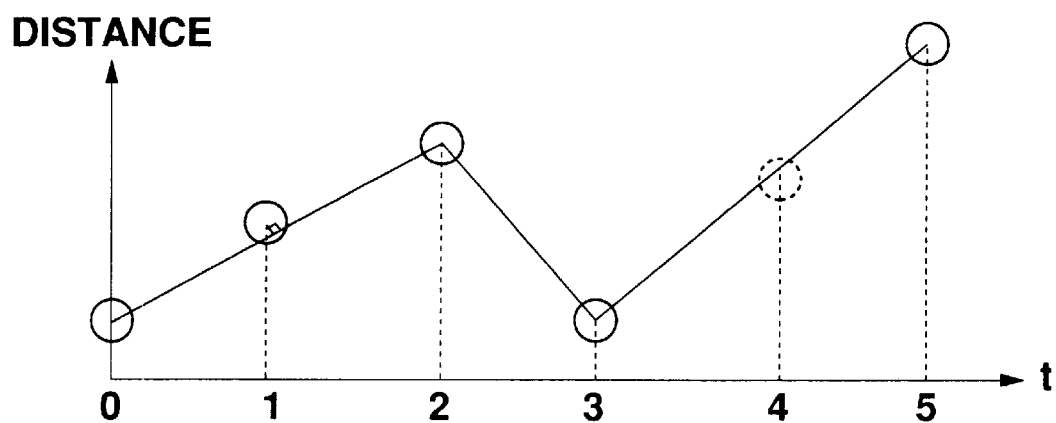
FIG. 19 is a diagram depicting the deletion of a standard frame in the second embodiment.

In this respect, the standard frame deletion section 115 executes deletion of unnecessary standard frames. FIGS. 17–19 are diagrams depicting the deletion of a standard frame. The horizontal axis in these diagrams shows time, and the vertical axis shows the distance from the original points of the x-y coordinates set on the frame. In addition, the ○ symbol in these diagrams shows the anchor region in schematic form. Deletion is executed in the following order.

[FIG. 17]

At first, six standard frames are set including the two outer frames. Here, the anchor of the start frame and the anchor of the end frame are joined with a straight line and the distance of each anchor from this straight line is calculated. When there is an anchor with a distance less than the designated value, the standard frame having this anchor is deleted. In the case shown in FIG. 17, there is no anchor to be deleted. Next, the anchor farthest from the straight line (hereinafter the farthest anchor) is found. Here, the anchor at t=3 is the farthest anchor.

[FIG. 18]

The straight line is erased, and the anchor at the start frame, the farthest anchor, and the anchor at the end frame are joined by a polygonal line so that the distances from these anchors to this line are once again determined. The anchor at t=4, which had a less distance than the designated value, is deleted. The anchor at t=2 now becomes the farthest anchor.

[FIG. 19]

The polygonal line is revised so as to pass through the new farthest anchor. Here, the anchor at t=2, which now has a less distance from the new regular than the designated value, is deleted. This ends the process.

In this example, two standard frames were deleted. When there are many standard frames at the beginning of the process, this sequence may be repeated: 1. deletion of standard frames less than the designated value, 2. finding of the farthest anchor, 3. revision of a polygonal line.

The above is an outline of the present embodiment. The following refinements or modifications are envisaged for this embodiment.

(1) MODIFICATION OF EQUATION 2

Equation 2 employed $f(t)=\cos \theta t$, but of course other equations may be employed. Functions of which value increases when $\theta t$ increases can be applicable.

(2) BLOCK-TAKING

In FIG. 13, an anchor block was determined so as to include the central vicinity of the anchor region, but other methods of determination are acceptable. For instance, an anchor region can itself be designated as a block. Similarly in FIG. 14, a block can be determined without regard to the size of the anchor block.

EMBODIMENT 3

The moving image hypermedia apparatus is applied so as to constitute the following apparatus or system.

1. INTERACTIVE VIDEO TEXT CREATION APPARATUS

Figure 20:
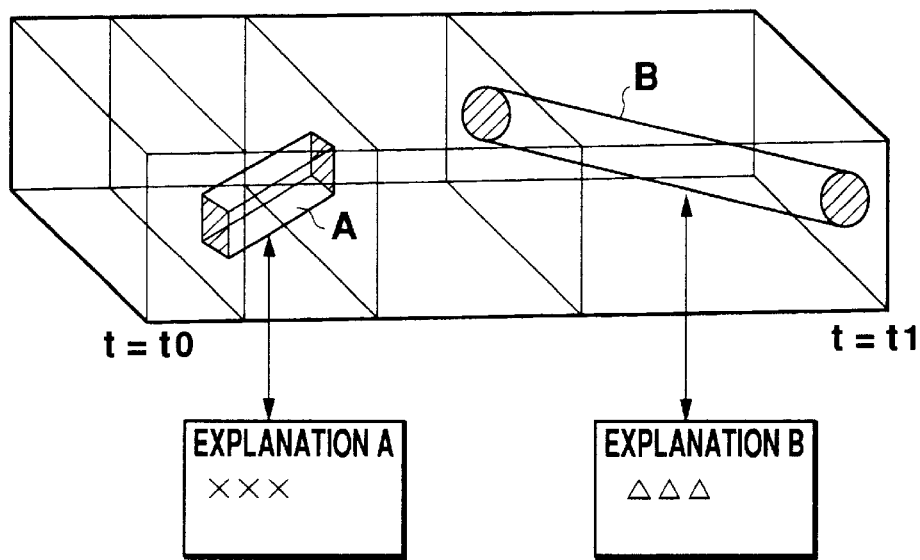
FIG. 20 is a diagram showing the structure of an interactive video text creation apparatus according to a third embodiment.

The moving image hypermedia apparatus according to the present invention is appropriate also to creation of CAI contents. That is, an anchor is set to a video text by using this apparatus so that required additional information is linked. FIG. 20 is a diagram showing video text created using the present apparatus. As shown in the diagram, the explanations A and B are respectively linked to the anchors A and B. Replaying the video, a student clicks an object on the screen when he wishes a more detailed explanation. If the clicked object is related to the anchor A, the explanation A will be displayed on the screen.

2. INTERACTIVE VIDEO SERVER SYSTEM

Figure 21:
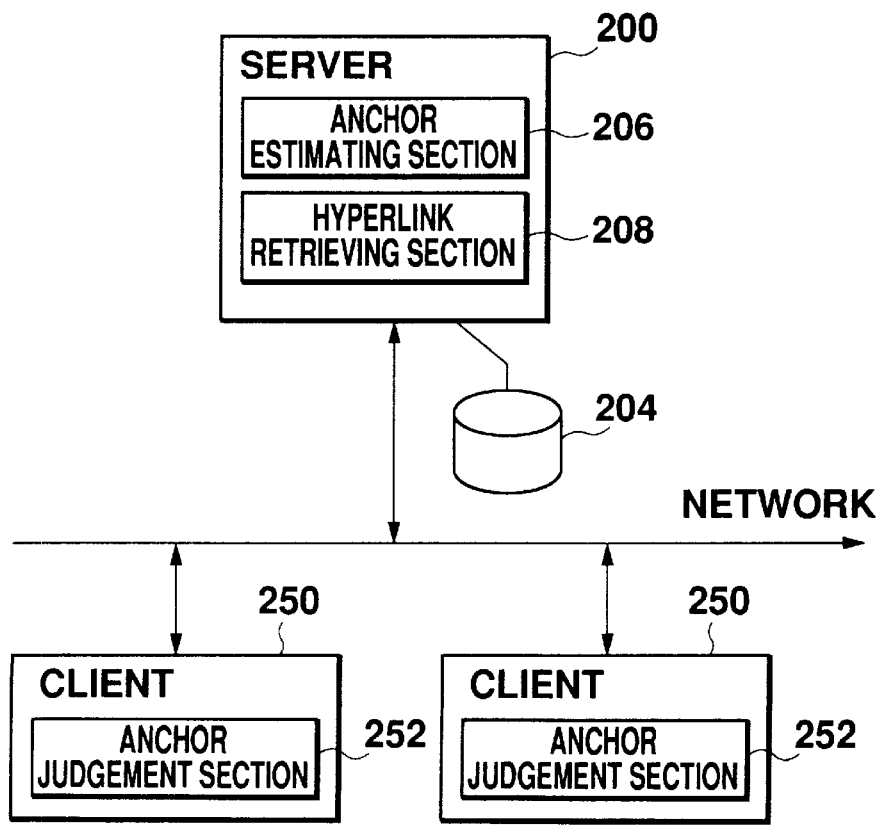
FIG. 21 is a diagram showing the structure of an interactive video server system according to the third embodiment.

The moving image hypermedia apparatus according to the present invention is appropriate also to a video server system. FIG. 21 is a diagram showing the structure of such a video server system. As shown in the diagram, this system comprises a server 200 and clients 250 which substantially share the structure shown in FIG. 1.

The server 200 comprises a data storage section 204 for storing a moving image, its anchor information, and relative information linked to an anchor, an anchor estimating section 206, a hyperlink retrieving section 208 for retrieving related data linked to a desired anchor. The anchor estimating section 206 estimates anchor information in a non-standard frame.

The client 250 comprises an anchor judgement section 252 for judging which anchor region is clicked when a user clicks an object in a moving image.

In this arrangement, when the user clicks some object on the screen on the client 250 side, the anchor judgement section 252 specifies an anchor clicked, and this information is sent to the server 200. The hyperlink retrieving section 208 in the server 200 retrieves related data linked to that anchor from the data storage section 204 and sends the data to the client 250.

As described above, according to this system, it is possible to collectively store moving image data and anchor information on the server 200 side so that many users can access desired moving images and their linked information.

What is claimed is:

1. A moving image anchor setting apparatus for setting an anchor to a moving image, comprising:

a frame specification portion for specifying at least a first frame from among a plurality of frames constituting the moving image;

an anchor setting portion for setting an anchor by selecting a particular region overlapping a target object within the first frame to be an anchor region; and an anchor estimating portion for determining anchor information for a second frame by performing pattern matching utilizing an image of the first frame, the anchor information of the first frame, and an image of the second frame;

wherein the frame specification portion detects a former frame wherein the target object included in the first frame appears and a latter frame where the target object disappears from among frames preceding or subsequent to the first frame so as to designate the former frame as a start frame of an anchor setting period and the latter frame as an end frame of the anchor setting period.

2. The moving image anchor setting apparatus as defined in claim 3, further comprising an anchor information editing portion which calculates a track of the anchor based on determined anchor information by the anchor estimating portion, and displays the track three-dimensionally.

3. The moving image anchor setting apparatus as defined in claim 1, further comprising an anchor information editing portion which calculates a track of the anchor based on determined anchor information by the anchor estimating portion, and displays a cross sectional view of the moving image along the track together with the track of the anchor.

4. The moving image anchor setting apparatus as defined in claim 1, wherein when a similar image is not found in the second frame, said automatic anchor setting portion divides an anchor setting period to provide a third frame so as to perform pattern matching again after shortening an interval between frames.

5. The moving image anchor setting apparatus as defined in claim 1, wherein the anchor setting determines anchor information with respect to an anchor group comprising a plurality of anchors as a unit.

6. The moving image anchor setting apparatus as defined in claim 1, further comprising an anchor retrieving portion for retrieving the anchor based related to information on movement of the anchor.

7. The moving image anchor setting apparatus of claim 1, wherein the pattern matching is a template matching technique.

8. The moving image anchor setting apparatus of claim 1, wherein the pattern matching is a structure matching technique.

9. The moving image anchor setting apparatus of claim 1, wherein the pattern matching is performed around a center of the anchor region.

10. The moving image anchor setting apparatus of claim 1, wherein said anchor estimating portion utilizes the image of the second frame to determine anchor information for a third frame.

11. A moving image anchor setting apparatus for inputting a moving image and setting an anchor to the moving image, comprising:

a frame determination section for determining a start frame and an end frame of an anchor setting period from among a plurality of frames constituting the moving image inputted;

an anchor setting section for, when an anchor region is specified in a standard frame in the anchor setting period, setting anchor information to the standard frame as information relating to the anchor region; and an anchor estimating section for estimating anchor information for a non-standard frame based on the anchor information set for a standard frame;

wherein the frame determination section determines a standard frame with the earliest time as a start frame and a standard frame with the latest time as an end frame when a plurality of standard frames are specified in an anchor setting period.

12. A moving image anchor setting apparatus for inputting a moving image and setting an anchor to the moving image, comprising:

a frame determination section for determining a start frame and an end frame of an anchor setting period from among a plurality of frames constituting the moving image inputted;

an anchor setting section for, when an anchor region is specified in a standard frame in the anchor setting period, setting anchor information to the standard frame as information relating to the anchor region; and an anchor estimating section for estimating anchor information for a non-standard frame based on the anchor information set for a standard frame;

wherein the frame determination section detects a frame wherein a target included in a standard frame appears and a frame where the target disappears from among frames preceding or subsequent to the standard frame so as to determine the former frame as a start frame and the latter frame as an end frame.

* * * * *